(12) United States Patent
Otsu

(10) Patent No.: US 11,548,340 B2
(45) Date of Patent: Jan. 10, 2023

(54) TOE CORRECTION BUSHING AND REAR SUSPENSION DEVICE

(71) Applicant: Prospira Corporation, Kawasaki (JP)

(72) Inventor: Kazutaka Otsu, Tokyo (JP)

(73) Assignee: Prospira Corporation, Kawasaki (JP)

(*) Notice: Subject to any disclaimer, the term of this patent is extended or adjusted under 35 U.S.C. 154(b) by 0 days.

(21) Appl. No.: 17/299,183

(22) PCT Filed: Jul. 19, 2019

(86) PCT No.: PCT/JP2019/028408
§ 371 (c)(1),
(2) Date: Jun. 2, 2021

(87) PCT Pub. No.: WO2020/129290
PCT Pub. Date: Jun. 25, 2020

(65) Prior Publication Data
US 2022/0032703 A1    Feb. 3, 2022

(30) Foreign Application Priority Data

Dec. 20, 2018 (JP) .............................. JP2018-238112
Dec. 20, 2018 (JP) .............................. JP2018-238113

(51) Int. Cl.
*B60G 7/02* (2006.01)
*F16F 13/10* (2006.01)
*F16F 13/14* (2006.01)

(52) U.S. Cl.
CPC .............. *B60G 7/02* (2013.01); *F16F 13/10* (2013.01); *F16F 13/14* (2013.01);
(Continued)

(58) Field of Classification Search
CPC .............. B60G 7/02; B60G 2200/142; B60G 2200/4622; B60G 2200/21;
(Continued)

(56) References Cited

U.S. PATENT DOCUMENTS

| 4,630,806 A | * | 12/1986 | Dan .................. | F16F 13/14 16/2.2 |
| 5,060,918 A | * | 10/1991 | Kanda ................ | F16F 13/14 180/312 |

(Continued)

FOREIGN PATENT DOCUMENTS

| CN | 102900759 A | * | 1/2013 | ............... B60G 7/02 |
| CN | 107405973 A | * | 11/2017 | ............... B60G 3/20 |

(Continued)

OTHER PUBLICATIONS

Satoshi Umemura, 'Machine Translation of JP H0872518 A Obtained Jul. 20, 2022', Mar. 19, 1996, Entire Document. (Year: 1996).*

(Continued)

*Primary Examiner* — James A English
*Assistant Examiner* — Scott F. Underwood
(74) *Attorney, Agent, or Firm* — Kenja IP Law PC

(57) ABSTRACT

A toe correction bushing including: an inner cylinder; a tubular damping mechanism which surrounds the inner cylinder; a retaining cylinder which surrounds the damping mechanism; an outer cylinder which surrounds the retaining cylinder; and an outer elastic body which connects the outer cylinder and the retaining cylinder. The retaining cylinder includes a bottom plate portion which extends inward in a radial direction from an end portion of the retaining cylinder on one side of an axial direction and a crimped portion which is located at an end portion on the other side of the axial direction and is crimped on the inside of the radial direction. The outer cylinder includes a facing surface which faces the one side of the axial direction and faces a part of a vehicle body. The facing surface is provided with a cushioning elastic body.

4 Claims, 7 Drawing Sheets

(52) U.S. Cl.
CPC .................. *B60G 2200/142* (2013.01); *B60G 2200/4622* (2013.01); *B60G 2204/12* (2013.01)

(58) Field of Classification Search
CPC .......... B60G 2200/462; B60G 2204/12; B60G 2204/1434; B60G 2204/41; B60G 2204/4106; B60G 21/053; B60G 2500/10; F16F 13/10; F16F 13/14; F16F 13/1445
See application file for complete search history.

(56) References Cited

U.S. PATENT DOCUMENTS

| | | | | |
|---|---|---|---|---|
| 2005/0035506 | A1* | 2/2005 | de Fontenay | B60G 7/006 267/140.12 |
| 2007/0235912 | A1* | 10/2007 | Sato | F16F 13/1445 267/140.13 |
| 2007/0296128 | A1* | 12/2007 | Asano | F16F 1/3828 267/140.12 |
| 2017/0299011 | A1* | 10/2017 | Kojima | F16F 1/3842 |
| 2020/0362938 | A1* | 11/2020 | Kojima | F16F 13/1481 |
| 2021/0148407 | A1* | 5/2021 | Werner | F16F 1/3814 |

FOREIGN PATENT DOCUMENTS

| | | | | | |
|---|---|---|---|---|---|
| EP | 1359340 | A1 | * | 11/2003 | ........... B60G 21/052 |
| GB | 2192968 | A | * | 1/1988 | .............. F16F 13/14 |
| JP | 08-72518 | A | | 3/1996 | |
| JP | 2001-059541 | A | | 3/2001 | |
| JP | 2002096617 | A | * | 4/2002 | ............... B60G 3/20 |
| JP | 2002103936 | A | * | 4/2002 | ........... B60G 21/052 |
| JP | 2002178735 | A | * | 6/2002 | .............. F16F 13/14 |
| JP | 2002240525 | A | * | 8/2002 | |
| JP | 2002266929 | A | * | 9/2002 | |
| JP | 2003-262249 | A | | 9/2003 | |
| JP | 2008249079 | A | | 10/2008 | |
| WO | WO-2020129367 | A1 | * | 6/2020 | |
| WO | WO-2020129891 | A1 | * | 6/2020 | |

OTHER PUBLICATIONS

Toshihiro Kakimoto, 'Machine Translation of JP 2001059541 Obtained Jul. 20, 2022', Mar. 6, 2001, Entire Document. (Year: 2001).*
International Search Report of PCT/JP2019/028408 dated Sep. 3, 2019 [PCT/ISA/210].
Sep. 19, 2022, search result of the Extended European Search Report issued by the European Patent Office in the corresponding European Patent Application No. 19899515.1.

* cited by examiner

TOE CORRECTION BUSHING AND REAR SUSPENSION DEVICE

CROSS REFERENCE TO RELATED APPLICATIONS

This application is a National Stage of International Application No. PCT/JP2019/028408, filed Jul. 19, 2019, claiming priorities to Japanese Patent Application Nos. 2018-238112 and 2018-238113, filed Dec. 20, 2018 respectively, the contents of all of which are incorporated herein by reference in their entirety.

TECHNICAL FIELD

The present invention relates to a toe correction bushing and a rear suspension device.

BACKGROUND ART

A toe correction bushing which is provided in a connection portion between a trailing arm and a vehicle body of an automobile and improves steering stability when turning is known. Patent Document 1 discloses a toe correction bushing including a toe correction mechanism which converts a load in a lateral direction of a vehicle when turning into a front and rear direction of the vehicle and improves steering stability of the vehicle and a liquid-sealed structure which is provided inside the bushing. The liquid-sealed structure functions as a damping mechanism which damps a vibration of a force converted into the front and rear direction of the vehicle.

CITATION LIST

Patent Document

[Patent Document 1]
Japanese Unexamined Patent Application, First Publication No. 2003-262249

SUMMARY OF INVENTION

Technical Problem

The present inventors have made a technique of reducing cost by standardizing a damping mechanism in various types of toe correction bushings. In this case, it is preferable to make a structure part of the damping mechanism independent of other structure parts and to assemble the pre-assembled damping mechanism to simplify the assembly configuration. On the other hand, since impact stress may be applied to the toe correction bushing, it is required to ensure a sufficient retaining strength of the damping mechanism.

Further, in the toe correction bushing, it is preferable to design the toe correction mechanism for each vehicle by considering a load or the like applied to the bushing. On the other hand, the damping mechanism that damps vibration can adopt the same structure in a wide range of vehicle models and is required to reduce cost by standardizing parts. However, in the toe correction bushing of the conventional structure, the toe correction mechanism and the liquid-sealed structure serving as the damping mechanism are integrally formed with each other and the standardization of the member serving as the damping mechanism is not considered.

The present invention has been made in view of the above-described circumstances and an object of the present invention is to provide a toe correction bushing capable of easily assembling a damping mechanism and ensuring a retaining strength of the damping mechanism and a rear suspension device including the toe correction bushing.

Further, an object of the present invention is to provide a toe correction bushing capable of standardizing a damping mechanism.

Solution to Problem

A toe correction bushing of the present invention is a toe correction bushing for connecting a trailing arm and a vehicle body to each other including: an inner cylinder which is fixed to the vehicle body; a tubular damping mechanism which surrounds the inner cylinder from the outside of a radial direction; a retaining cylinder which surrounds the damping mechanism from the outside of the radial direction; an outer cylinder which surrounds the retaining cylinder from the outside of the radial direction and is fixed to the trailing arm; and an outer elastic body which connects the outer cylinder and the retaining cylinder to each other. In the toe correction bushing, the damping mechanism includes an inner elastic body which is located between the inner cylinder and the retaining cylinder in the radial direction. In the toe correction bushing, the damping mechanism is provided with a plurality of liquid chambers which are arranged side by side along a circumferential direction and filled with a liquid sealed by the inner elastic body and an orifice passage which allows the plurality of liquid chambers to communicate with each other. In the toe correction bushing, the damping mechanism is inserted and fixed into the retaining cylinder.

Advantageous Effects of Invention

According to the present invention, it is possible to provide the toe correction bushing capable of easily assembling the damping mechanism and ensuring the retaining strength of the damping mechanism and the rear suspension device including the toe correction bushing.

Further, according to the present invention, it is possible to provide the toe correction bushing capable of standardizing the damping mechanism.

DESCRIPTION OF EMBODIMENTS

Figure 1:
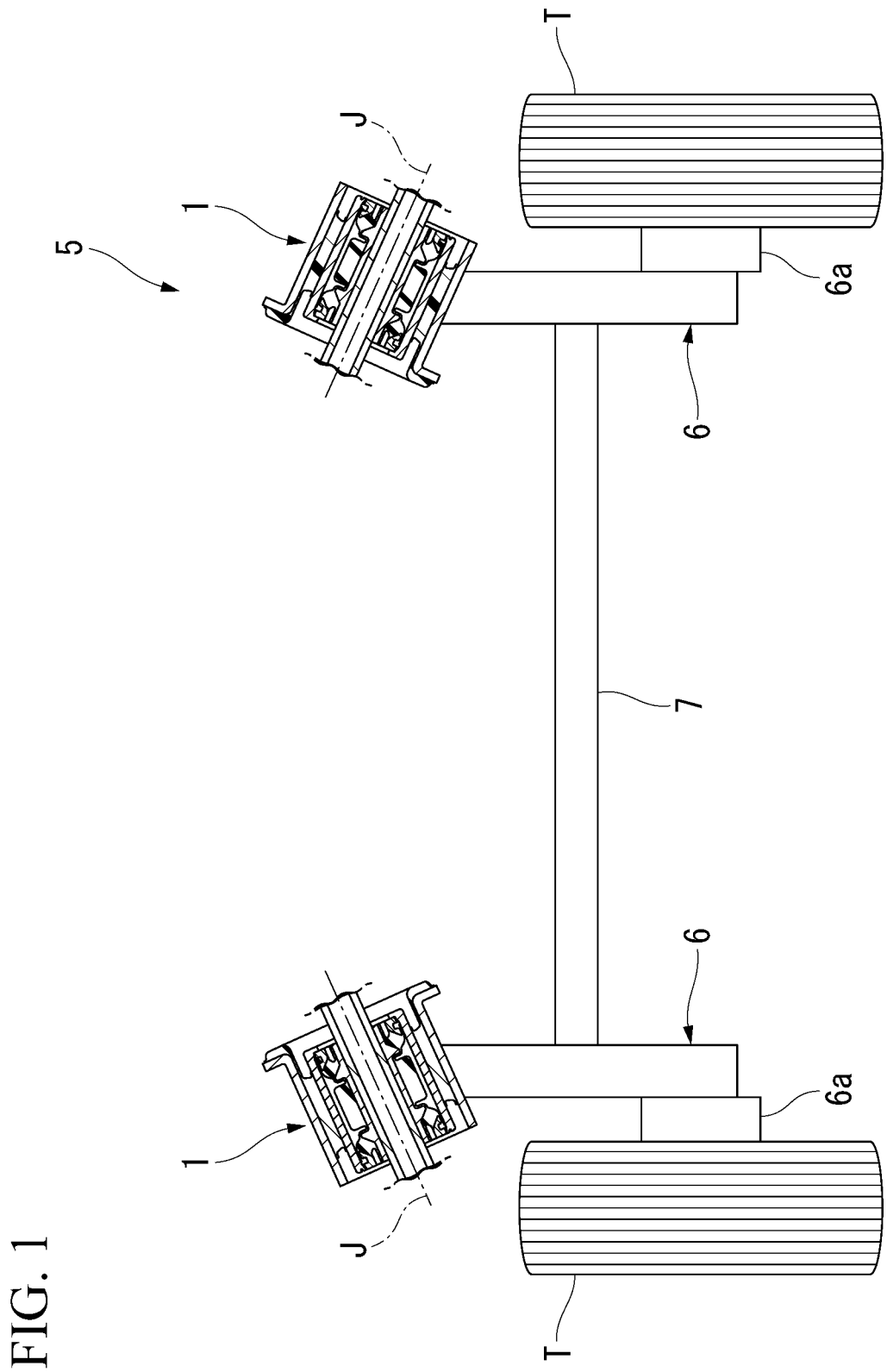
FIG. 1 is a schematic view of a suspension device including a toe correction bushing of an embodiment.

A toe correction bushing of an anti-vibration device according to the present invention is a toe correction bushing for connecting a trailing arm and a vehicle body to each other including: an inner cylinder which is fixed to the vehicle body; a tubular damping mechanism which surrounds the inner cylinder from the outside of a radial direction; a retaining cylinder which surrounds the damping mechanism from the outside of the radial direction; an outer cylinder which surrounds the retaining cylinder from the outside of the radial direction and is fixed to the trailing arm; and an outer elastic body which connects the outer cylinder and the retaining cylinder to each other. In the toe correction bushing, the damping mechanism includes an inner elastic body which is located between the inner cylinder and the retaining cylinder in the radial direction. In the toe correction bushing, the damping mechanism is provided with a plurality of liquid chambers which are arranged side by side along a circumferential direction and filled with a liquid sealed by the inner elastic body and an orifice passage which allows the plurality of liquid chambers to communicate with each other. In the toe correction bushing, the damping mechanism is inserted and fixed into the retaining cylinder.

Hereinafter, a toe correction bushing 1 of a first embodiment of the anti-vibration device according to the present invention will be described. In the drawings used in the following description, for the purpose of emphasizing the feature part, the feature part may be enlarged for convenience and the dimensional ratio of each component is not always the same as the actual one. In addition, for the same purpose, non-feature parts may be omitted.

FIG. 1 is a schematic view of a rear suspension device 5 including the toe correction bushing 1 of this embodiment. Additionally, in FIG. 1, the upper side of the drawing is the front side of the vehicle body. The rear suspension device 5 of this embodiment is mounted on a four-wheeled vehicle.

The rear suspension device 5 includes a pair of left and right trailing arms 6 each of which extends in the front and rear direction and has a tire T attached to a rear portion thereof, a toe correction bushing 1 which connects the trailing arm 6 and the vehicle body to each other, and a torsion beam 7 which connects the pair of left and right trailing arms 6 to each other. The trailing arm 6 is connected to the toe correction bushing 1 at a front end portion of the trailing arm. Further, the trailing arm 6 rotatably supports the tire T through a rear support member 6a at a rear end portion of the trailing arm.

Figure 2:
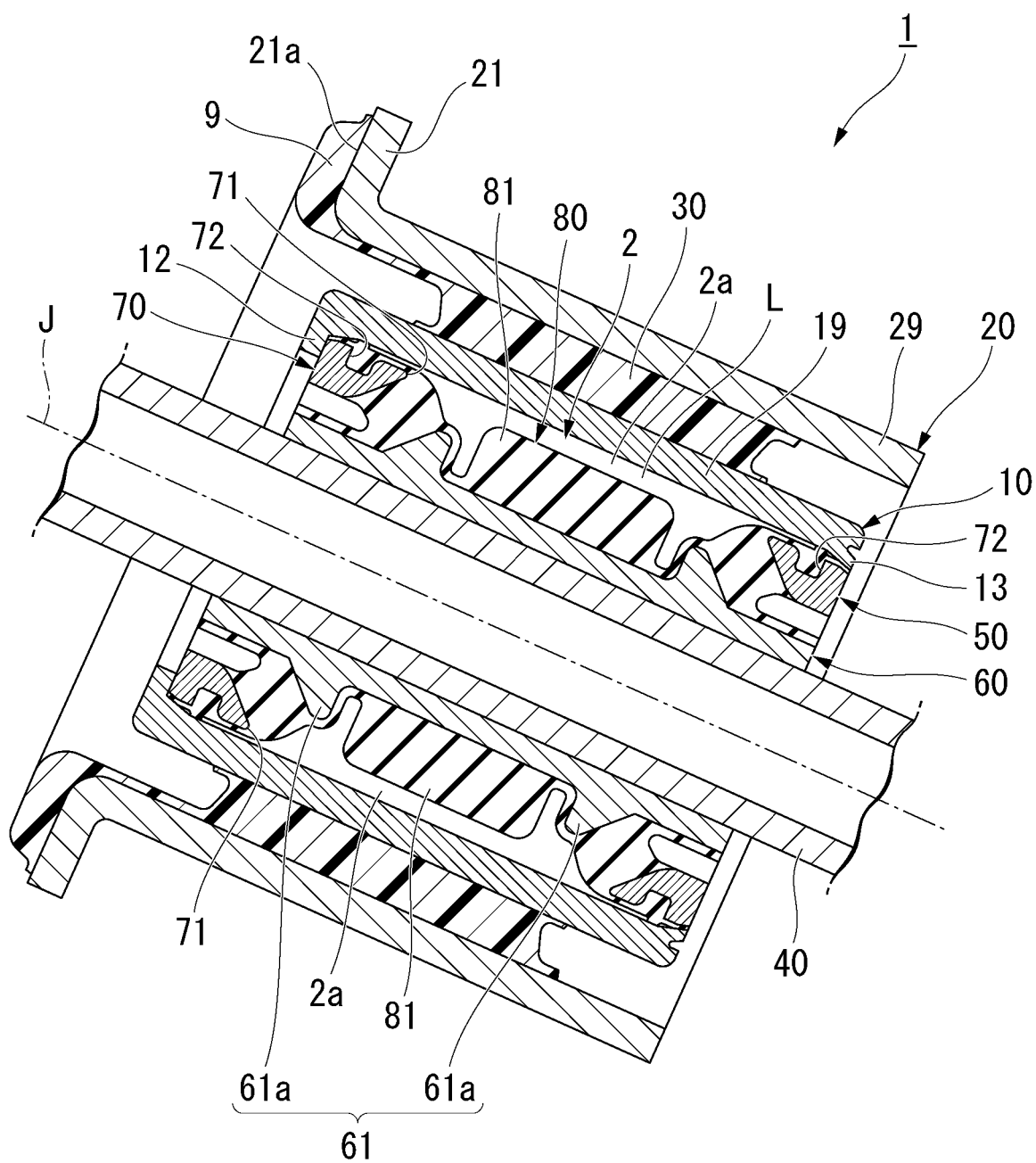
FIG. 2 is a cross-sectional view of the toe correction bushing.
Figure 3:
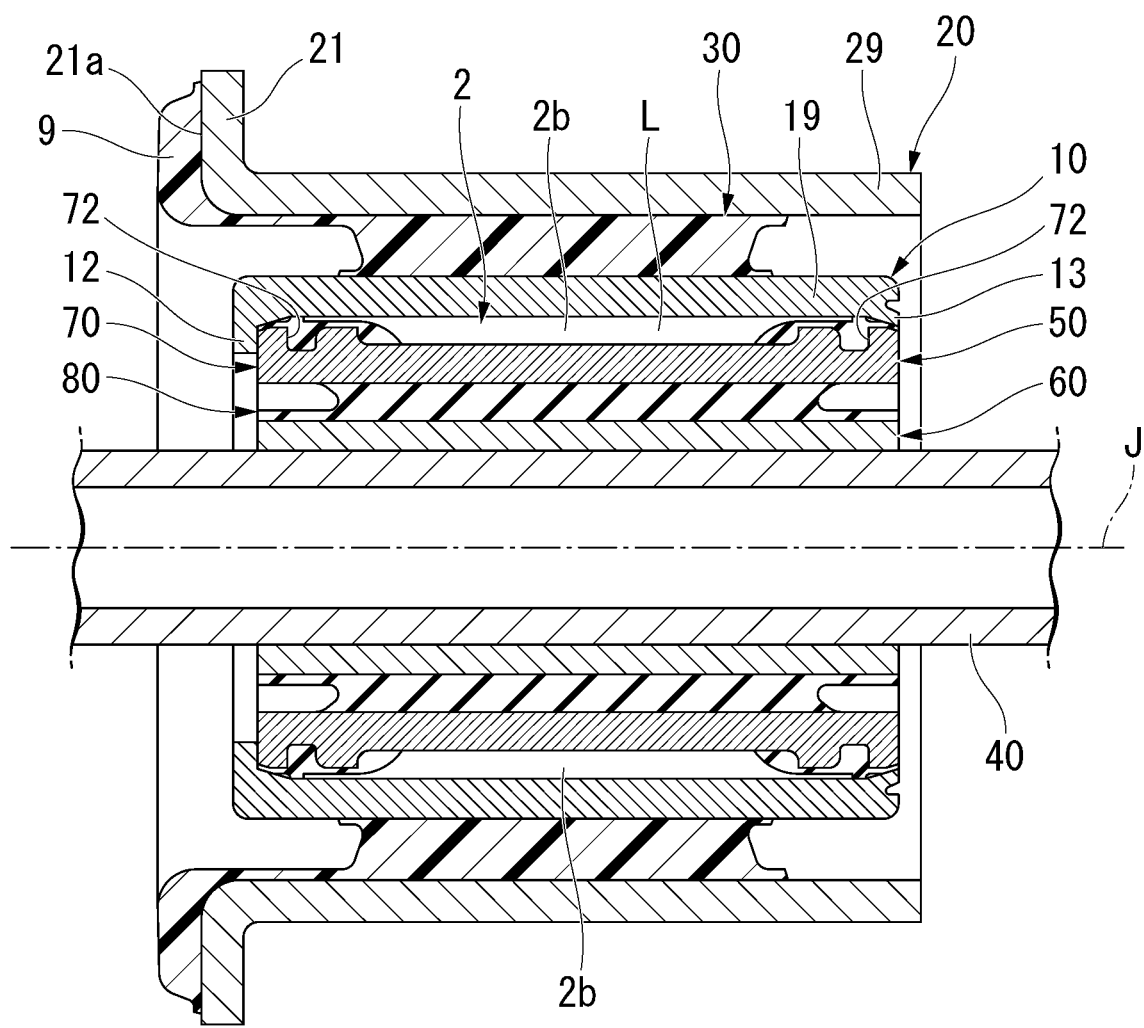
FIG. 3 is a cross-sectional view of the toe correction bushing in a cross-section different from that of FIG. 2.

FIGS. 2 and 3 are cross-sectional views of the toe correction bushing 1. In FIG. 2, the upper side of the drawing is the front side of the vehicle body. In FIG. 3, the upper side of the drawing is the upper side of the vehicle body. Further, in FIGS. 2 and 3, the left side of the drawing is the inside of the vehicle width direction and the right side of the drawing is the outside of the vehicle width direction of the vehicle.

As shown in FIGS. 2 and 3, the toe correction bushing 1 includes an inner cylinder 40 which extends along a center axis J, a damping mechanism 50 which retains the inner cylinder 40, a retaining cylinder 10 which retains the damping mechanism 50, an outer elastic body 30 which is disposed around the retaining cylinder 10, and an outer cylinder 20 which retains the retaining cylinder 10 through the outer elastic body 30.

Additionally, each center axis of the inner cylinder 40, the damping mechanism 50, the retaining cylinder 10, and the outer cylinder 20 is disposed on the common center axis J. In the present specification, in the plan view in which the toe correction bushing 1 is viewed from the axial direction, a direction orthogonal to the center axis J is referred to as a radial direction and a direction around the center axis J is referred to as a circumferential direction. Further, a direction parallel to the center axis J is simply referred to as an axial direction.

The inner cylinder 40 is fixed to the vehicle body. Both end portions of the inner cylinder 40 in the axial direction respectively protrude outward from both ends of each outer cylinder 20 in the axial direction. The inner cylinder 40 is fixed to the vehicle body, for example, at both end portions of the axial direction.

The damping mechanism 50 has a tubular shape which surrounds the inner cylinder 40 from the outside of the radial direction. The damping mechanism 50 includes an inner sheath portion 60, an outer sheath portion 70, and an inner elastic body 80. That is, the toe correction bushing 1 includes an inner sheath portion 60, an outer sheath portion 70, and an inner elastic body 80.

The inner sheath portion 60 has a tubular shape extending along the center axis J. The inner sheath portion 60 surrounds the inner cylinder 40 from the outside of the radial direction. The inner cylinder 40 is fitted into the inner sheath portion 60. Accordingly, the damping mechanism 50 is fixed to the inner cylinder 40. According to this embodiment, since the damping mechanism 50 includes the inner sheath portion 60, the damping mechanism 50 can be reliably retained by the inner cylinder 40 at the inner sheath portion 60.

The inner sheath portion 60 includes a pair of base portions 61. The pair of base portions 61 is arranged side by side along the circumferential direction. As shown in FIG. 2, the base portions 61 are respectively disposed on the front side and the rear side with respect to the center axis J. The base portion 61 includes a pair of compartments 61a which is arranged side by side along the axial direction. A block portion 81 of the inner elastic body 80 is disposed between the pair of compartments 61a.

The outer sheath portion 70 surrounds the inner cylinder 40 and the inner sheath portion 60 from the outside of the radial direction. The outer sheath portion 70 has a tubular shape centered on the center axis J. As shown in FIG. 2, a pair of window portions 71 is provided in the outer sheath portion 70. The pair of window portions 71 is arranged side by side along the circumferential direction. The window portions 71 are respectively provided on the front side and the rear side with respect to the center axis J. The pair of window portions 71 are located at the substantially center of the outer sheath portion 70 in the axial direction.

An outer peripheral surface of the outer sheath portion 70 is provided with a pair of recessed grooves 72 which extends along the circumferential direction.

The recessed grooves 72 are respectively disposed on both sides of the window portion 71 in the axial direction. A part of the inner elastic body 80 is filled into the recessed groove 72. As will be described later, at least a part of the outer sheath portion 70 is buried in the inner elastic body 80. Since a part of the inner elastic body 80 intrudes into the recessed groove 72 of the outer sheath portion 70, the fixation strength between the outer sheath portion 70 and the inner elastic body 80 can be improved.

An outer peripheral surface of the outer sheath portion 70 is fitted to an inner peripheral surface of the retaining cylinder 10 through a part of the inner elastic body 80. According to this embodiment, since the damping mechanism 50 includes the outer sheath portion 70, the damping mechanism 50 can be reliably retained by the retaining cylinder 10 at the outer sheath portion 70.

The inner elastic body 80 is made of rubber, an elastomer resin, or the like. The inner elastic body 80 is located between the inner cylinder 40 and the retaining cylinder 10 in the radial direction. The inner elastic body 80 is fixed to an outer peripheral surface facing the outside of the radial direction of the inner sheath portion 60. Further, the outer sheath portion 70 is buried in the inner elastic body 80. Accordingly, the inner elastic body 80 connects the inner sheath portion 60 and the outer sheath portion 70 to each other.

The inner elastic body 80 includes the pair of block portions 81. The block portion 81 is disposed between the pair of compartments 61a of the inner sheath portion 60 in the axial direction. The block portion 81 is disposed on the inside of the window portion 71 of the outer sheath portion 70.

As shown in FIGS. 2 and 3, the damping mechanism 50 is provided with a filling space 2 filled with a liquid L sealed by the inner elastic body 80. As the liquid L filled into the filling space 2, an incompressible liquid is adopted. Further, it is preferable to adopt a low-viscosity fluid as the liquid L in order to obtain sufficient damping characteristics against vibrations in the high frequency band.

The filling space 2 extends along the circumferential direction. The filling space 2 includes a pair of liquid chambers 2a and a pair of orifice passages 2b. That is, the damping mechanism 50 is provided with the plurality of liquid chambers 2a and the orifice passage 2b allowing the plurality of liquid chambers 2a to communicate with each other. The liquid chamber 2a and the orifice passage 2b are alternately disposed along the circumferential direction. The orifice passage 2b allows the pair of liquid chambers 2a to communicate with each other.

As shown in FIG. 2, the liquid chamber 2a is disposed inside the window portion 71 of the outer sheath portion 70. The liquid chamber 2a is surrounded by the inner elastic body 80 and the retaining cylinder 10. The wall surfaces of the liquid chamber 2a on the inside of the radial direction and both sides of the axial direction are made by the inner elastic body 80 and the wall surface of the liquid chamber 2a on the outside of the radial direction is made by the retaining cylinder 10. Further, the orifice passage 2b is connected to both sides of the liquid chamber 2a in the circumferential direction.

As shown in FIG. 3, the orifice passage 2b is surrounded by the outer sheath portion 70, the inner elastic body 80, and the retaining cylinder 10. The wall surface of the orifice passage 2b on the inside of the radial direction is made by the outer sheath portion 70, the wall surfaces of the orifice passage 2b on both sides of the axial direction are made by the inner elastic body 80, and the wall surface of the orifice passage 2b on the outside of the radial direction is made by the retaining cylinder 10.

In this embodiment, a vibration of the front and rear direction is applied from the retaining cylinder 10 to the damping mechanism 50. When the vibration of the front and rear direction is applied to the damping mechanism 50, the inner sheath portion 60 is displaced in the front and rear direction with respect to the outer sheath portion 70 and the inner elastic body 80 is deformed. As a result, the volumes of the pair of liquid chambers 2a change. As the volumes of the pair of liquid chambers 2a change, the liquid L in the pair of liquid chambers 2a moves to each other through the orifice passage 2b. The damping mechanism 50 promotes vibration damping by the flow action of the liquid L.

Additionally, in this embodiment, the filling space 2 including the pair of liquid chambers 2a and the pair of orifice passages 2b connecting them has been exemplified. However, the filling space 2 of the damping mechanism 50 is not limited to this embodiment if the filling space includes the plurality of liquid chambers 2a arranged side by side along the circumferential direction and the orifice passage 2b allowing the plurality of liquid chambers 2a to communicate with each other.

The retaining cylinder 10 surrounds the damping mechanism 50 from the outside of the radial direction. The damping mechanism 50 is inserted and fixed into the retaining cylinder 10. The retaining cylinder 10 is located inside both end portions of the inner cylinder 40 in the axial direction. Similarly, the retaining cylinder 10 is located inside both end portions of the outer cylinder 20 in the axial direction. The retaining cylinder 10 includes a tubular retaining cylinder body 19 which extends along the axial direction and a bottom plate portion 12 and a crimped portion 13 which are respectively located on both sides of the retaining cylinder body 19 in the axial direction.

The bottom plate portion 12 extends inward in the radial direction from one end portion of the retaining cylinder body 19 in the axial direction. The bottom plate portion 12 extends along the circumferential direction with the center axis J as the center. The bottom plate portion 12 has a plate shape with the axial direction as the plate thickness direction. The bottom plate portion 12 contacts the end surface of the outer sheath portion 70 facing one side of the axial direction.

The crimped portion 13 is located at the end portion on the other side of the retaining cylinder body 19 in the axial direction. The crimped portion 13 extends along the circumferential direction. The crimped portion 13 is formed by crimping inward in the radial direction while the damping mechanism 50 is inserted into the retaining cylinder body 19. The crimped portion 13 presses the end portion of the outer sheath portion 70 facing the other side of the axial direction from the other side of the radial direction. That is, the bottom plate portion 12 and the crimped portion 13 sandwich the damping mechanism 50 from both sides of the axial direction. Accordingly, the damping mechanism 50 is fixed to the retaining cylinder 10. In the assembling process, the damping mechanism 50 is inserted into the retaining cylinder 10 from the other side of the axial direction and the crimped portion 13 is formed while the damping mechanism 50 contacts the bottom plate portion 12, so that the damping mechanism is fixed to the retaining cylinder 10.

The outer cylinder 20 surrounds the retaining cylinder 10 from the outside of the radial direction. As shown in FIG. 1, the outer cylinder 20 is fixed to the trailing arm 6. The outer cylinder 20 is fixed to the vehicle wheel of the tire T through the trailing arm 6.

As shown in FIG. 2, the outer cylinder 20 includes a tubular outer cylinder body 29 which extends along the axial direction and a flange portion 21 which is located at one side of the outer cylinder body 29 in the axial direction. The flange portion 21 extends outward in the radial direction from one end portion of the outer cylinder body 29 in the axial direction. The flange portion 21 extends along the circumferential direction with the center axis J as the center. The flange portion 21 has a plate shape with the axial direction as the plate thickness direction.

The flange portion 21 includes a facing surface 21a which faces one side of the axial direction. That is, the outer cylinder 20 includes the facing surface 21a. The facing surface 21a faces a part of the vehicle body (not shown) in the axial direction. The facing surface 21a is provided with a cushioning elastic body 9 which is a part of the outer elastic body 30.

The outer elastic body 30 is made of rubber, an elastomer resin, or the like. The outer elastic body 30 includes a toe correction portion (i.e., intervening portion) 31 which is provided between the outer cylinder 20 and the retaining cylinder 10 in the radial direction and a cushioning elastic body 9 which is provided in the flange portion 21. The toe correction portion 31 and the cushioning elastic body 9 are integrally molded with each other.

The toe correction portion 31 is disposed between the inner peripheral surface of the outer cylinder 20 and the outer peripheral surface of the retaining cylinder 10.

The toe correction portion 31 overlaps the liquid chamber 2a of the damping mechanism 50 in the axial direction. The toe correction portion 31 is fixed to the inner peripheral surface of the outer cylinder 20 and the outer peripheral surface of the retaining cylinder 10. That is, the outer elastic body 30 connects the outer cylinder 20 and the retaining cylinder 10 at the toe correction portion 31. The toe correction portion 31 converts a force of the axial direction applied to the outer cylinder 20 into the front and rear direction of the vehicle body and transmits the force to the retaining cylinder 10.

The cushioning elastic body 9 is provided in the facing surface 21a of the outer cylinder 20 facing one side of the axial direction. The cushioning elastic body 9 faces a part of the vehicle body (not shown) with a gap therebetween. The cushioning elastic body 9 suppresses an impact of a collision with a part of the vehicle body and the facing surface 21a when an impact is applied to the toe correction bushing 1.

As shown in FIG. 1, the toe correction bushing 1 of this embodiment connects the trailing arm 6 and the vehicle body while the center axis J is inclined in the front and rear direction of the vehicle body as it is directed toward the vehicle width direction. More specifically, in the toe correction bushing 1 of this embodiment, the center axis J is inclined forward as it is directed inward in the vehicle width direction.

When a vehicle having such a torsion beam type suspension mechanism receives, for example, an input of a cornering force or the like in the vehicle left and right direction, the retaining cylinder 10 moves in the front and rear direction of the vehicle body due to the deformation of the toe correction portion 31 of the outer elastic body 30. The inner cylinder 40 also moves in the front and rear direction of the vehicle body as the retaining cylinder 10 moves in the front and rear direction of the vehicle body and the movement of the tire T can be controlled to improve steering stability and ride quality. Further, since the vibration of the retaining cylinder 10 in accordance with the movement of the front and rear direction is damped by the damping mechanism 50, the ride quality of the operator is further improved.

According to this embodiment, the damping mechanism 50 is inserted and fixed into the retaining cylinder 10. That is, in this embodiment, the inner elastic body of the damping mechanism 50 is not fixed to the retaining cylinder 10. Therefore, according to this embodiment, the toe correction bushing 1 can be assembled by inserting the pre-assembled damping mechanism 50 into the retaining cylinder 10. In the general toe correction bushing, it is preferable to appropriately set the elastic modulus and the like of the toe correction portion 31 in accordance with the weight of the vehicle body to be mounted, the acceleration performance, and the like. On the other hand, the configuration of the damping mechanism 50 can be a standard design for various vehicle bodies. According to this embodiment, since a structure in which the damping mechanism 50 is inserted into the retaining cylinder 10 is adopted, the damping mechanism 50 can be standardized in the toe correction bushings 1 having different configurations. As a result, the toe correction bushing 1 can be manufactured at low cost.

According to this embodiment, the outer elastic body 30 including the toe correction portion 31 and the inner elastic body 80 of the damping mechanism 50 are respectively individually provided as separate bodies. Therefore, the characteristics of the materials such as the elastic modulus and durability of the toe correction portion 31 exhibiting a toe correction function and the inner elastic body 80 exhibiting a damping function can be individually designed. As a result, it is possible to realize an optimum configuration for each of the toe correction portion 31 and the damping mechanism 50.

According to this embodiment, the damping mechanism 50 is disposed inside the retaining cylinder 10. Therefore, a force converted into the front and rear direction of the vehicle body while being transmitted from the outer cylinder to the retaining cylinder 10 is applied to the damping mechanism 50. That is, according to this embodiment, it is possible to suppress a force of the axial direction from being applied to the damping mechanism 50 and to improve the durability of the inner elastic body 80 of the damping mechanism 50.

According to this embodiment, the damping mechanism 50 is fixed to the retaining cylinder 10 by crimping. Therefore, the process of fixing the damping mechanism 50 to the retaining cylinder 10 is facilitated and the manufacturing cost of the toe correction bushing 1 can be reduced.

In this embodiment, the damping mechanism 50 is sandwiched by the bottom plate portion 12 and the crimped portion 13 from both sides of the axial direction. According to this embodiment, the cushioning elastic body 9 and the bottom plate portion 12 of the retaining cylinder 10 are both disposed at one side of the axial direction. Therefore, a force of separating the damping mechanism 50 from the retaining cylinder 10 due to an impact force directed in the axial direction when the retaining cylinder 10 and the vehicle body collide with each other through the cushioning elastic body 9 is applied to the bottom plate portion 12. Since the crimped portion 13 is formed by crimping, the strength of the crimped portion 13 is lower than that of the bottom plate portion 12. According to this embodiment, it is possible to suppress an impact force from being applied to the crimped portion 13 and suppress the retaining cylinder 10 from being separated from the damping mechanism 50 even when an impact is applied thereto.

In this embodiment, the axial position of the liquid chamber 2a overlaps the axial position of the toe correction portion 31. Therefore, a vibration caused by the deformation of the toe correction portion 31 is efficiently transmitted to the liquid chamber 2a of the damping mechanism 50 and the damping effect of the damping mechanism 50 can be improved.

In this embodiment, stress applied to the outer cylinder 20 is transmitted to the retaining cylinder 10 through the deformation of the outer elastic body 30. Further, the retaining cylinder 10 is located inside both end portions of the outer cylinder 20 in the axial direction. Therefore, the displacement of the outer elastic body 30 becomes uniform along the axial direction, the displacement of the retaining cylinder 10 in the radial direction with respect to the outer cylinder 20 can be stabilized, and the toe correction function of the toe correction bushing 1 can be improved.

In this embodiment, stress applied to the retaining cylinder 10 is transmitted to the inner cylinder 40 through the deformation of the inner elastic body 80. Further, the retaining cylinder 10 is located inside both end portions of the inner cylinder 40 in the axial direction. Therefore, the displacement of the inner elastic body 80 becomes uniform along the axial direction, the displacement of the inner cylinder 40 in the radial direction with respect to the retaining cylinder 10 can be stabilized, and the toe correction function of the toe correction bushing 1 can be improved.

A toe correction bushing according to the present invention is a toe correction bushing for connecting a trailing arm and a vehicle body to each other including: an inner cylinder which is fixed to the vehicle body; a tubular damping mechanism which surrounds the inner cylinder from the outside of a radial direction; a retaining cylinder which surrounds the damping mechanism from the outside of the radial direction; an outer cylinder which surrounds the retaining cylinder from the outside of the radial direction and is fixed to the trailing arm; and an outer elastic body which connects the outer cylinder and the retaining cylinder to each other, wherein the damping mechanism includes an inner elastic body which is located between the inner cylinder and the retaining cylinder in the radial direction, wherein the damping mechanism is provided with a plurality of liquid chambers which are arranged side by side along a circumferential direction and filled with a liquid sealed by the inner elastic body and an orifice passage which allows the plurality of liquid chambers to communicate with each other, wherein the retaining cylinder includes a tubular retaining cylinder body which extends in an axial direction along a center axis of the inner cylinder, a bottom plate portion which extends inward in the radial direction from an end portion of the retaining cylinder body on one side of the axial direction, and a crimped portion which is located at an end portion of the retaining cylinder body on the other side of the axial direction and is crimped inward in the radial direction while the damping mechanism is inserted into the retaining cylinder body, wherein the outer cylinder includes a facing surface which faces the one side of the axial direction and faces a part of the vehicle body, and wherein the facing surface is provided with a cushioning elastic body which cushions an impact of a collision with a part of the vehicle body.

According to the above-described configuration, the damping mechanism is inserted into the retaining cylinder and is fixed by crimping. The inner elastic body of the damping mechanism is not fixed to the retaining cylinder. Therefore, according to the above-described configuration, it is possible to assemble the toe correction bushing by inserting the pre-assembled damping mechanism into the retaining cylinder. In the general toe correction bushing, it is preferable to appropriately set the elastic modulus and the like of the intervening portion in accordance with the weight of the vehicle body to be mounted, the acceleration performance, and the like. On the other hand, the configuration of the damping mechanism can be a standard design for various vehicle bodies. According to this embodiment, since a structure in which the damping mechanism is inserted into the retaining cylinder is adopted, the damping mechanism can be standardized in the toe correction bushings in a wide range of vehicles having different configurations. As a result, the toe correction bushing can be manufactured at low cost.

Further, according to the above-described configuration, the damping mechanism is retained in the retaining cylinder by crimping. Therefore, the process of fixing the damping mechanism to the retaining cylinder is facilitated and the manufacturing cost of the toe correction bushing can be reduced.

Further, according to the above-described configuration, when an impact is applied to the toe correction bushing, the cushioning elastic body suppresses an impact of a collision with a part of the vehicle body and the facing surface and can suppress the damping mechanism from being separated from the retaining cylinder.

Further, according to the above-described configuration, the cushioning elastic body and the bottom plate portion of the retaining cylinder are both disposed on one side of the axial direction. Therefore, a force of separating the damping mechanism from the retaining cylinder due to an impact force directed in the axial direction when the retaining cylinder and the vehicle body collide with each other through the cushioning elastic body is applied to the bottom plate portion. Since the crimped portion is formed by crimping, the strength of the crimped portion is lower than that of the bottom plate portion. According to this embodiment, even when an impact is applied, it is possible to suppress an impact force from being applied to the crimped portion and to suppress the retaining cylinder from being separated from the damping mechanism.

In the toe correction bushing, the outer elastic body may include an intervening portion which connects the outer cylinder and the inner cylinder to each other in the radial direction and an axial position of the liquid chamber may overlap an axial position of the intervening portion.

According to the above-described configuration, since the liquid chamber and the intervening portion overlap each other in the axial direction, it is possible to suppress the vibration of the retaining cylinder caused by the deformation of the outer elastic body in a well-balanced manner by the liquid chamber.

In the toe correction bushing, the retaining cylinder may be located inside both end portions of the inner cylinder and the outer cylinder in the axial direction.

According to the above-described configuration, the retaining cylinder is disposed inside both end portions of the outer cylinder in the axial direction. Therefore, it is possible to stabilize the displacement of the retaining cylinder in the radial direction with respect to the outer cylinder and to improve the toe correction function.

Further, according to the above-described configuration, the retaining cylinder is disposed inside both end portions of the inner cylinder in the axial direction. Therefore, it is possible to stabilize the displacement of the inner cylinder in the radial direction with respect to the retaining cylinder and to improve the toe correction function.

The damping mechanism may further include an inner sheath portion into which the inner cylinder is fitted and an outer sheath portion which surrounds the inner sheath portion from the outside of the radial direction and the inner sheath portion and the outer sheath portion may be connected to each other by the inner elastic body.

According to the above-described configuration, the inner elastic body in the damping mechanism is supported by the inner sheath portion and the outer sheath portion. Therefore, the damping mechanism can be reliably retained by the inner cylinder at the inner sheath portion. Further, the damping mechanism can be reliably retained by the retaining cylinder at the outer sheath portion. That is, according to the above-described configuration, it is possible to improve the retaining strength of the damping mechanism with respect to the inner cylinder and the retaining cylinder.

A rear suspension device includes: the toe correction bushing; a pair of left and right trailing arms which extends in a front and rear direction of the vehicle body and has a tire attached to a rear portion thereof; and a torsion beam which connects the pair of left and right trailing arms to each other and the toe correction bushing connects the trailing arm and the vehicle body to each other while the center axis is inclined in the front and rear direction of the vehicle body as it is directed toward a vehicle width direction.

According to the above-described configuration, it is possible to provide the rear suspension device using the toe correction bushing having the above-described effect.

Hereinafter, a toe correction bushing 1 of a second embodiment of the anti-vibration device according to the present invention will be described. In the drawings used in the following description, for the purpose of emphasizing the feature part, the feature part may be enlarged for convenience and the dimensional ratio of each component is not always the same as the actual one. In addition, for the same purpose, non-feature parts may be omitted.

Figure 4:
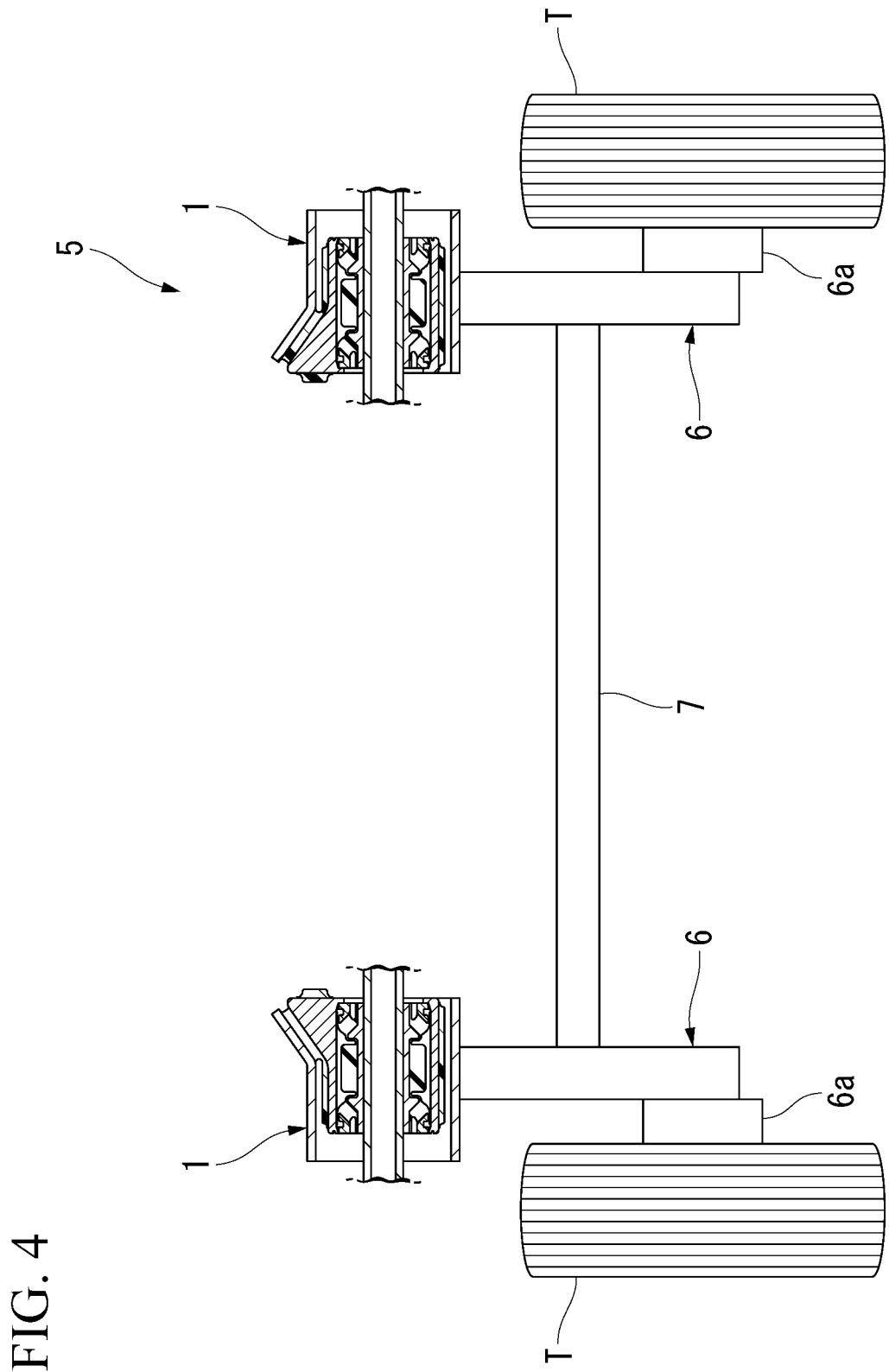
FIG. 4 is a schematic view of the suspension device including the toe correction bushing of the embodiment.

FIG. 4 is a schematic view of a rear suspension device 5 including the toe correction bushing 1 of this embodiment. Additionally, in FIG. 4, the upper side of the drawing is the front side of the vehicle body. The rear suspension device 5 of this embodiment is mounted on a four-wheeled vehicle.

The rear suspension device 5 includes a pair of left and right trailing arms 6 each of which extends in the front and rear direction and has a tire T attached to a rear portion thereof, a toe correction bushing 1 which connects the trailing arm 6 and the vehicle body to each other, and a torsion beam 7 which connects the pair of left and right trailing arms 6 to each other. The trailing arm 6 is connected to the toe correction bushing 1 at a front end portion of the trailing arm. Further, the trailing arm 6 rotatably supports the tire T through a rear support member 6a at a rear end portion of the trailing arm.

Figure 5:
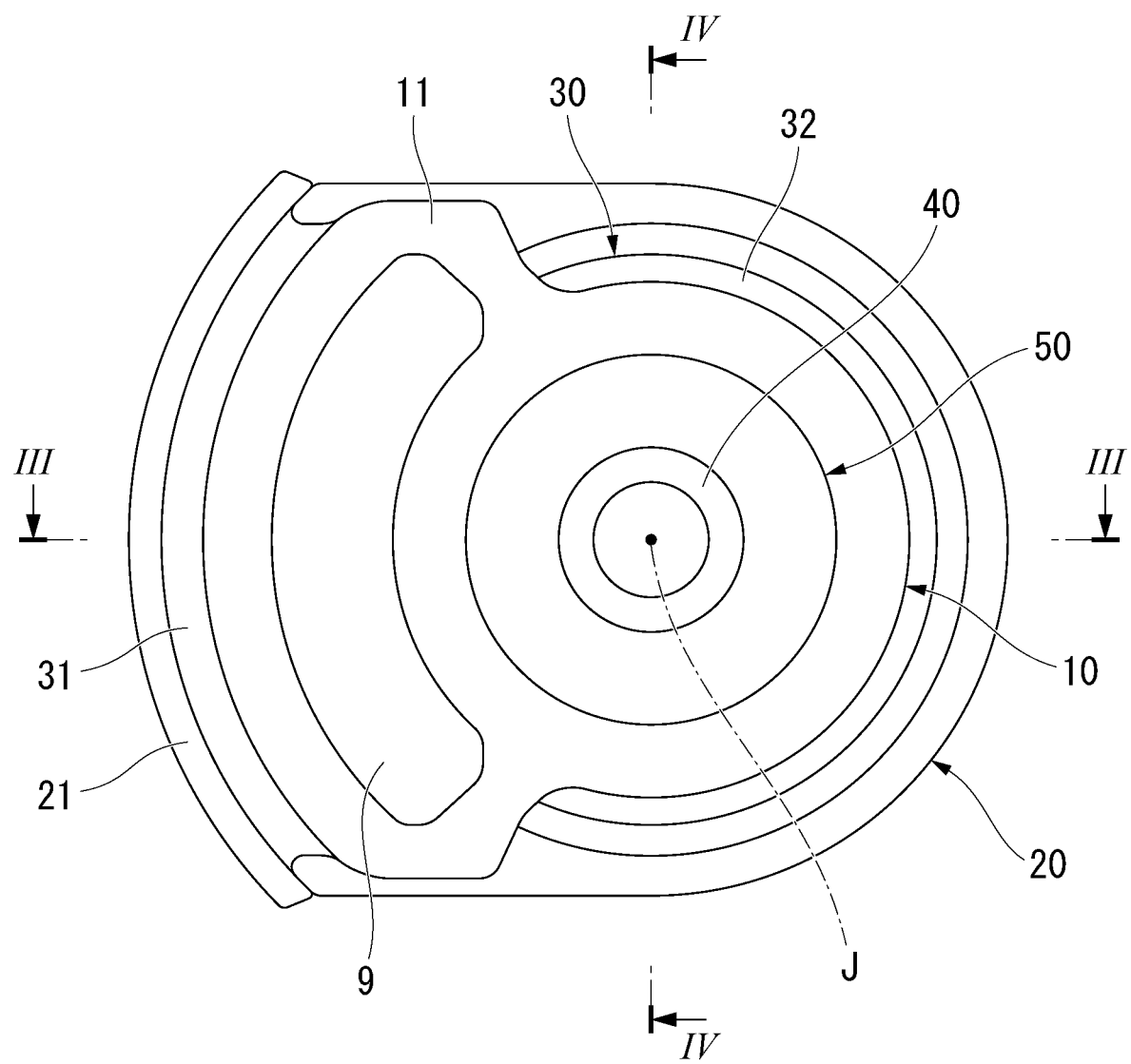
FIG. 5 is a front view of the toe correction bushing.
Figure 6:
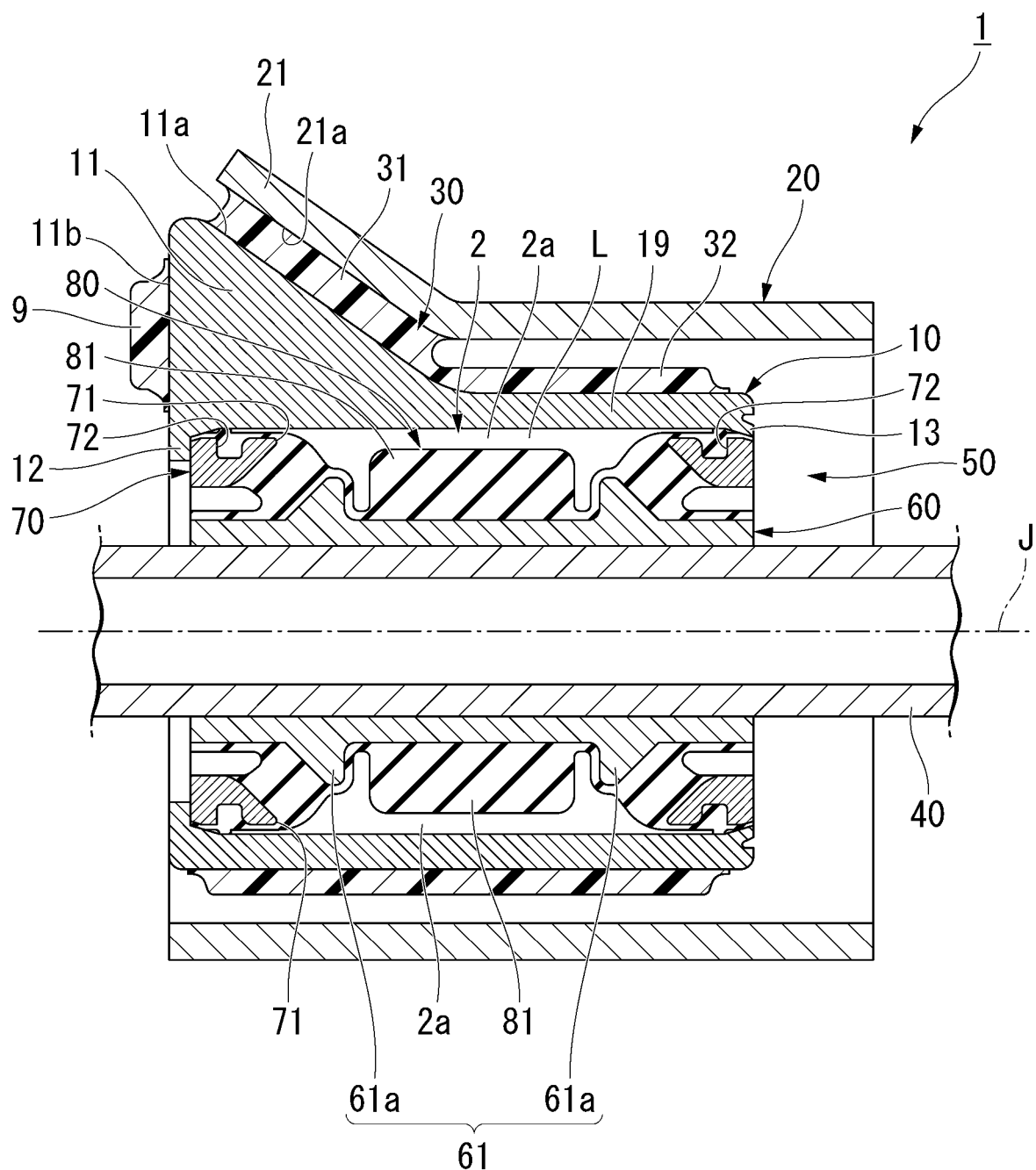
FIG. 6 is a cross-sectional view of the toe correction bushing taken along a line III-III of FIG. 5.
Figure 7:
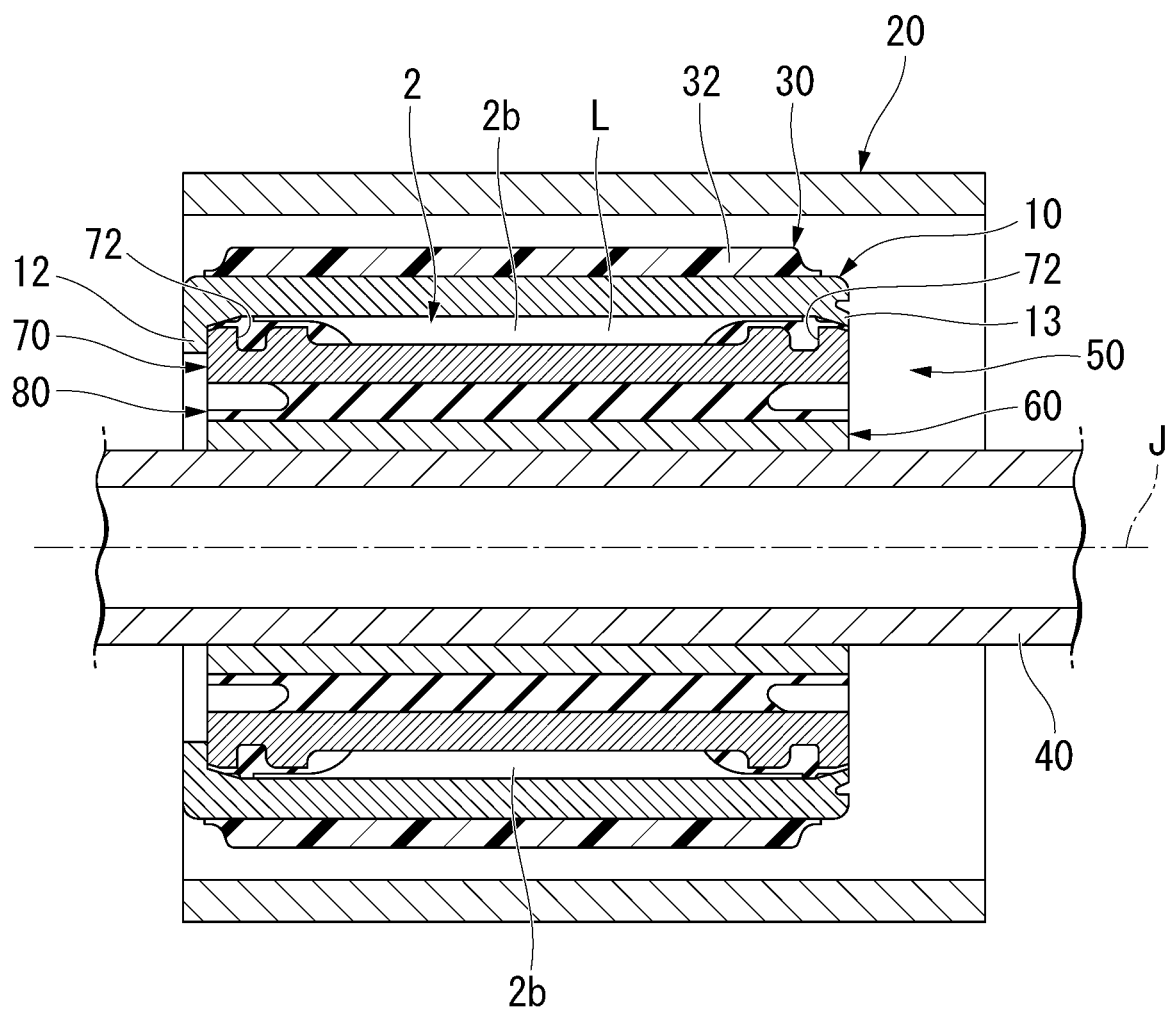
FIG. 7 is a cross-sectional view of the toe correction bushing taken along a line IV-IV of FIG. 5.

FIG. 5 is a front view of the toe correction bushing 1. FIG. 6 is a cross-sectional view of the toe correction bushing 1 taken along a line III-III of FIG. 5. FIG. 7 is a cross-sectional view of the toe correction bushing 1 taken along a line IV-IV of FIG. 5. In FIG. 5, the left side of the drawing is the front side of the vehicle body. In FIG. 6, the upper side of the drawing is the front side of the vehicle body. In FIG. 7, the upper side of the drawing is the upper side of the vehicle body. Further, in FIGS. 6 and 7, the left side of the drawing is the inside of the vehicle width direction and the right side of the drawing is the outside of the vehicle width direction of the vehicle.

As shown in FIGS. 6 and 7, the toe correction bushing 1 includes an inner cylinder 40 which extends along a center axis J, a damping mechanism 50 which retains the inner cylinder 40, a retaining cylinder 10 which retains the damping mechanism 50, an outer elastic body 30 which is disposed around the retaining cylinder 10, an outer cylinder 20 which retains the retaining cylinder 10 through the outer elastic body 30, and a cushioning elastic body 9.

Additionally, each center axis of the inner cylinder 40, the damping mechanism 50, the retaining cylinder 10, and the outer cylinder 20 is disposed on the common center axis J. In the present specification, in the plan view in which the toe correction bushing 1 is viewed from the axial direction, a direction orthogonal to the center axis J is referred to as a radial direction and a direction around the center axis J is referred to as a circumferential direction. Further, a direction parallel to the center axis J is simply referred to as an axial direction.

In this embodiment, an extension direction of the center axis J (i.e., the axial direction) matches the vehicle width direction. Further, in the following description, one side of the axial direction means the inside of the vehicle width direction and the other side of the axial direction means the outside of the vehicle width direction.

The inner cylinder 40 is fixed to the vehicle body. Both end portions of the inner cylinder 40 in the axial direction respectively protrude outward from both ends of each outer cylinder 20 in the axial direction. The inner cylinder 40 is fixed to the vehicle body, for example, at both end portions of the axial direction.

The damping mechanism 50 has a tubular shape which surrounds the inner cylinder 40 from the outside of the radial direction. The damping mechanism 50 includes an inner sheath portion 60, an outer sheath portion 70, and an inner elastic body 80. That is, the toe correction bushing 1 includes an inner sheath portion 60, an outer sheath portion 70, and an inner elastic body 80.

The inner sheath portion 60 has a tubular shape extending along the center axis J. The inner sheath portion 60 surrounds the inner cylinder 40 from the outside of the radial direction. The inner cylinder 40 is fitted into the inner sheath portion 60. Accordingly, the damping mechanism 50 is fixed to the inner cylinder 40. According to this embodiment, since the damping mechanism 50 includes the inner sheath portion 60, the damping mechanism can be reliably retained by the inner cylinder 40 at the inner sheath portion 60.

The inner sheath portion 60 includes a pair of base portions 61. The pair of base portions 61 is arranged side by side along the circumferential direction. As shown in FIG. 6, the base portions 61 are respectively disposed on the front side and the rear side with respect to the center axis J. The base portion 61 includes a pair of compartments 61a which is arranged side by side along the axial direction. A block portion 81 of the inner elastic body 80 is disposed between the pair of compartments 61a.

The outer sheath portion 70 surrounds the inner cylinder 40 and the inner sheath portion 60 from the outside of the radial direction. The outer sheath portion 70 has a tubular shape centered on the center axis J. As shown in FIG. 6, a pair of window portions 71 is provided in the outer sheath portion 70. The pair of window portions 71 is arranged side by side along the circumferential direction. The window portions 71 are respectively provided on the front side and the rear side with respect to the center axis J. The pair of window portions 71 are located at the substantially center of the outer sheath portion 70 in the axial direction.

An outer peripheral surface of the outer sheath portion 70 is provided with a pair of recessed grooves 72 which extends along the circumferential direction.

The recessed grooves 72 are respectively disposed on both sides of the window portion 71 in the axial direction. A part of the inner elastic body 80 is filled into the recessed groove 72. As will be described later, at least a part of the outer sheath portion 70 is buried in the inner elastic body 80. Since a part of the inner elastic body 80 intrudes into the recessed groove 72 of the outer sheath portion 70, the fixation strength between the outer sheath portion 70 and the inner elastic body 80 can be improved.

An outer peripheral surface of the outer sheath portion 70 is fitted to an inner peripheral surface of the retaining cylinder 10 through a part of the inner elastic body 80. According to this embodiment, since the damping mechanism 50 includes the outer sheath portion 70, the damping mechanism 50 can be reliably retained by the retaining cylinder 10 at the outer sheath portion 70.

The inner elastic body 80 is made of rubber, an elastomer resin, or the like. The inner elastic body 80 is located between the inner cylinder 40 and the retaining cylinder 10 in the radial direction. The inner elastic body 80 is fixed to an outer peripheral surface facing the outside of the inner sheath portion 60 in the radial direction. Further, the outer sheath portion 70 is buried in the inner elastic body 80. Accordingly, the inner elastic body 80 connects the inner sheath portion 60 and the outer sheath portion 70 to each other.

The inner elastic body 80 includes the pair of block portions 81. The block portion 81 is disposed between the pair of compartments 61a of the inner sheath portion 60 in the axial direction. The block portion 81 is disposed on the inside of the window portion 71 of the outer sheath portion 70.

As shown in FIGS. 6 and 7, the damping mechanism 50 is provided with a filling space 2 filled with a liquid L sealed by the inner elastic body 80. As the liquid L filled into the filling space 2, an incompressible liquid is adopted. Further, it is preferable to adopt a low-viscosity fluid as the liquid L in order to obtain sufficient damping characteristics against vibrations in the high frequency band.

The filling space 2 extends along the circumferential direction. The filling space 2 includes a pair of liquid chambers 2a and a pair of orifice passages 2b. That is, the damping mechanism 50 is provided with the plurality of liquid chambers 2a and the orifice passage 2b allowing the plurality of liquid chambers 2a to communicate with each other. The liquid chamber 2a and the orifice passage 2b are alternately disposed along the circumferential direction. The orifice passage 2b allows the pair of liquid chambers 2a to communicate with each other.

As shown in FIG. 6, the liquid chamber 2a is disposed inside the window portion 71 of the outer sheath portion 70. The liquid chamber 2a is surrounded by the inner elastic body 80 and the retaining cylinder 10. The wall surfaces of the liquid chamber 2a on the inside of the radial direction and both sides of the axial direction are made by the inner elastic body 80 and the wall surface of the liquid chamber 2a on the outside of the radial direction is made by the retaining cylinder 10. Further, the orifice passage 2b is connected to both sides of the liquid chamber 2a in the circumferential direction.

As shown in FIG. 7, the orifice passage 2b is surrounded by the outer sheath portion 70, the inner elastic body 80, and the retaining cylinder 10. The wall surface of the orifice passage 2b on the inside of the radial direction is made by the outer sheath portion 70, the wall surfaces of the orifice passage 2b on both sides of the axial direction are made by the inner elastic body 80, and the wall surface of the orifice passage 2b on the outside of the radial direction is made by the retaining cylinder 10.

In this embodiment, a vibration of the front and rear direction is applied from the retaining cylinder 10 to the damping mechanism 50. When the vibration of the front and rear direction is applied to the damping mechanism 50, the inner sheath portion 60 is displaced in the front and rear direction with respect to the outer sheath portion 70 and the inner elastic body 80 is deformed. As a result, the volumes of the pair of liquid chambers 2a change. As the volumes of the pair of liquid chambers 2a change, the liquid L in the pair of liquid chambers 2a moves to each other through the orifice passage 2b. The damping mechanism 50 promotes vibration damping by the flow action of the liquid L.

Additionally, in this embodiment, the filling space 2 including the pair of liquid chambers 2a and the pair of orifice passages 2b connecting them has been exemplified. However, the filling space 2 of the damping mechanism 50 is not limited to this embodiment if the filling space includes the plurality of liquid chambers 2a arranged side by side along the circumferential direction and the orifice passage 2b allowing the plurality of liquid chambers 2a to communicate with each other.

The retaining cylinder 10 surrounds the damping mechanism 50 from the outside of the radial direction. The damping mechanism 50 is inserted and fixed into the retaining cylinder 10. The retaining cylinder 10 includes a tubular retaining cylinder body 19 which extends along the axial direction, an inner inclined base portion 11 which protrudes outward from the outer peripheral surface of the retaining cylinder body 19, and a bottom plate portion 12 and a crimped portion 13 which are respectively located on both sides of the retaining cylinder body 19 in the axial direction.

The inner inclined base portion 11 is located at one end portion of the retaining cylinder body 19 in the axial direction. The inner inclined base portion 11 gradually protrudes outward in the radial direction as it is directed outward in the axial direction. The inner inclined base portion 11 is provided only at the front side of the center axis J in the circumferential direction and is not provided in the entire circumference. The inner inclined base portion 11 includes an inner inclined surface 11a which faces outward in the radial direction. The inner inclined surface 11a is a tapered surface which extends outward in the radial direction (more specifically, the front side of the vehicle body) as it is directed toward one side of the axial direction.

The inner inclined base portion 11 includes a facing surface 11b which faces one side of the axial direction. That is, the retaining cylinder 10 includes the facing surface 11b. The facing surface 11b of the inner inclined base portion 11 faces a part of the vehicle body (not shown) in the axial direction. The facing surface 11b is provided with the cushioning elastic body 9 which is made of rubber, an elastomer resin, or the like. The cushioning elastic body 9 suppresses an impact of a collision with a part of the vehicle body and the facing surface 11b when an impact is applied to the toe correction bushing 1.

The bottom plate portion 12 extends inward in the radial direction from one end portion of the retaining cylinder body 19 in the axial direction. The bottom plate portion 12 extends along the circumferential direction with the center axis J as the center. The bottom plate portion 12 has a plate shape with the axial direction as the plate thickness direction. The bottom plate portion 12 contacts the end surface of the outer sheath portion 70 facing one side of the axial direction.

The crimped portion 13 is located at the end portion of the retaining cylinder body 19 on the other side of the axial direction. The crimped portion 13 extends along the circumferential direction. The crimped portion 13 is formed by crimping inward in the radial direction while the damping mechanism 50 is inserted into the retaining cylinder body 19. The crimped portion 13 presses the end portion of the outer sheath portion 70 facing the other side of the axial direction from the other side of the radial direction. That is, the bottom plate portion 12 and the crimped portion 13 sandwich the damping mechanism 50 from both sides of the axial direction. Accordingly, the damping mechanism 50 is fixed to the retaining cylinder 10. In the assembling process the damping mechanism 50 is inserted into the retaining cylinder 10 from the other side of the axial direction and the crimped portion 13 is formed while the damping mechanism contacts the bottom plate portion 12, so that the damping mechanism 50 is fixed to the retaining cylinder 10.

The outer cylinder 20 surrounds the retaining cylinder 10 from the outside of the radial direction. As shown in FIG. 4, the outer cylinder 20 is fixed to the trailing arm 6. The outer cylinder 20 is fixed to the vehicle wheel of the tire T through the trailing arm 6.

As shown in FIG. 6, the end portion of the outer cylinder 20 on one side of the axial direction is provided with an outer inclined wall 21 which is formed in a protruding manner and gradually extends outward in the radial direction as it is directed outward in the axial direction. The outer inclined wall 21 is provided only at the front side of the center axis J in the circumferential direction and is not provided in the entire circumference. The outer inclined wall 21 includes an outer inclined surface 21a which faces the inside of the radial direction. The outer inclined surface 21a is a tapered surface which extends outward in the radial direction (more specifically, the front side of the vehicle body) as it is directed toward one side of the axial direction. The outer inclined surface 21a faces the inner inclined surface 11a.

The outer elastic body 30 is made of rubber, an elastomer resin, or the like. The outer elastic body 30 is provided between the outer cylinder 20 and the retaining cylinder 10 in the radial direction and connects the outer cylinder 20 and the retaining cylinder 10 to each other. The outer elastic body 30 includes a toe correction portion (i.e., intervening portion) 31 and a retaining cylinder surrounding portion 32. The toe correction portion 31 and the retaining cylinder surrounding portion 32 are integrally molded with each other.

The toe correction portion 31 is disposed between the inner inclined surface 11a and the outer inclined surface 21a. The toe correction portion 31 is fixed to the inner inclined surface 11a and the outer inclined surface 21a. That is, the outer elastic body 30 connects the outer cylinder 20 and the retaining cylinder 10 to each other at the toe correction portion 31.

The toe correction portion 31 converts a force in the axial direction applied to the outer cylinder 20 into the front and rear direction of the vehicle body and transmits the force to the retaining cylinder 10.

The retaining cylinder surrounding portion 32 is fixed to the outer peripheral surface of the retaining cylinder body 19 of the retaining cylinder 10. The retaining cylinder surrounding portion 32 faces the inner peripheral surface of the outer cylinder 20 with a gap therebetween. When an impact force is applied to the outer cylinder 20, the retaining cylinder surrounding portion 32 protects the inner peripheral surface of the outer cylinder 20 and the outer peripheral surface of the retaining cylinder 10 and cushions the impact force.

The toe correction bushing 1 with the above-described configuration is assembled in such a manner that the outer cylinder 20 is fitted to an attachment hole formed in the pair of trailing arms 6 and extending in the vehicle left and right direction and the inner cylinder 40 is fixed to the vehicle body. This toe correction bushing 1 is assembled so that the outer inclined surface 21a and the inner inclined surface 11a are located on the vehicle front and rear direction axis and the center axis J is located on the vehicle left and right direction axis in the three-dimensional coordinate system including the vehicle left and right direction axis, the vehicle front and rear direction axis, and the vehicle up and down direction axis.

When a vehicle having such a torsion beam type suspension mechanism receives, for example, an input of a cornering force or the like in the vehicle left and right direction, the retaining cylinder 10 moves in the front and rear direction of the vehicle body due to the deformation of the toe correction portion 31 of the outer elastic body 30. The inner cylinder 40 also moves in the front and rear direction of the vehicle body as the retaining cylinder 10 moves in the front and rear direction of the vehicle body and the movement of the tire T can be controlled to improve steering stability and ride quality. Further, since the vibration of the retaining cylinder 10 in accordance with the movement of the front and rear direction is damped by the damping mechanism 50, the ride quality of the operator is further improved.

According to this embodiment, the damping mechanism 50 is inserted and fixed into the retaining cylinder 10. That is, in this embodiment, the inner elastic body of the damping mechanism 50 is not fixed to the retaining cylinder 10. Therefore, according to this embodiment, the toe correction bushing 1 can be assembled by inserting the pre-assembled damping mechanism 50 into the retaining cylinder 10. In the general toe correction bushing, it is preferable to appropriately set the elastic modulus and the like of the toe correction portion 31 in accordance with the weight of the vehicle body to be mounted, the acceleration performance, and the like. On the other hand, the configuration of the damping mechanism 50 can be a standard design for various vehicle bodies. According to this embodiment, since a structure in which the damping mechanism 50 is inserted into the retaining cylinder 10 is adopted, the damping mechanism 50 can be standardized in the toe correction bushings 1 having different configurations. As a result, the toe correction bushing 1 can be manufactured at low cost.

According to this embodiment, the outer elastic body 30 including the toe correction portion 31 and the inner elastic body 80 of the damping mechanism 50 are respectively individually provided as separate bodies. Therefore, the characteristics of the materials such as the elastic modulus and durability of the toe correction portion 31 exhibiting a toe correction function and the inner elastic body 80 exhibiting a damping function can be individually designed. As a result, it is possible to realize an optimum configuration for each of the toe correction portion 31 and the damping mechanism 50.

According to this embodiment, the damping mechanism 50 is disposed inside the retaining cylinder 10. Therefore, a force converted into the front and rear direction of the vehicle body while being transmitted from the outer cylinder to the retaining cylinder 10 is applied to the damping mechanism 50. That is, according to this embodiment, it is possible to suppress a force of the axial direction from being applied to the damping mechanism 50 and to improve the durability of the inner elastic body 80 of the damping mechanism 50.

According to this embodiment, the damping mechanism 50 is fixed to the retaining cylinder 10 by crimping. Therefore, the process of fixing the damping mechanism 50 to the retaining cylinder 10 is facilitated and the manufacturing cost of the toe correction bushing 1 can be reduced.

In this embodiment, the damping mechanism 50 is sandwiched by the bottom plate portion 12 and the crimped portion 13 from both sides of the axial direction. According to this embodiment, the cushioning elastic body 9 and the bottom plate portion 12 of the retaining cylinder 10 are both disposed at one side of the axial direction. Therefore, a force of separating the damping mechanism 50 from the retaining cylinder 10 due to an impact force directed in the axial direction when the retaining cylinder 10 and the vehicle body collide with each other through the cushioning elastic body 9 is applied to the bottom plate portion 12. Since the crimped portion 13 is formed by crimping, the strength of the crimped portion 13 is lower than that of the bottom plate portion 12. According to this embodiment, it is possible to suppress an impact force from being applied to the crimped portion 13 and suppress the retaining cylinder 10 from being separated from the damping mechanism 50 even when an impact is applied thereto.

A toe correction bushing according to the present invention is a toe correction bushing connecting a trailing arm and a vehicle body to each other including: an inner cylinder which extends along an axial direction of a center axis extending along a vehicle width direction of the vehicle body and is fixed to the vehicle body; a tubular damping mechanism which surrounds the inner cylinder from an outside of a radial direction; a retaining cylinder which surrounds the damping mechanism from the outside of the radial direction; an outer cylinder which surrounds the retaining cylinder from the outside of the radial direction and is fixed to the trailing arm; and an outer elastic body which connects the outer cylinder and the retaining cylinder to each other, wherein the retaining cylinder includes an inner inclined surface which extends outward in the radial direction as it is directed toward one side of the axial direction, wherein the outer cylinder includes an outer inclined surface which extends outward in the radial direction as it is directed toward the one side of the axial direction and faces the inner inclined surface, wherein the outer elastic body includes an intervening portion which is disposed between the inner inclined surface and the outer inclined surface, wherein the damping mechanism includes an inner elastic body which is located between the inner cylinder and the retaining cylinder in the radial direction, wherein the damping mechanism is provided with a plurality of liquid chambers arranged side by side in a circumferential direction and filled with a liquid sealed by the inner elastic body and an orifice passage allowing the plurality of liquid chambers to communicate with each other, and wherein the damping mechanism is inserted and fixed into the retaining cylinder.

According to the above-described configuration, the damping mechanism is inserted and fixed into the retaining cylinder. That is, in this embodiment, the inner elastic body of the damping mechanism is not fixed to the retaining cylinder. Therefore, according to the above-described configuration, it is possible to assemble the toe correction bushing by inserting the pre-assembled damping mechanism into the retaining cylinder. In the general toe correction bushing, it is preferable to appropriately set the elastic modulus and the like of the intervening portion in accordance with the weight of the vehicle body to be mounted, the acceleration performance, and the like. On the other hand, the configuration of the damping mechanism can be a standard design for various vehicle bodies. According to this embodiment, since a structure in which the damping mechanism is inserted into the retaining cylinder is adopted, the damping mechanism can be standardized in the toe correction bushings in a wide range of vehicles having different configurations. As a result, the toe correction bushing can be manufactured at low cost.

In addition, according to the above-described configuration, the damping mechanism is disposed inside the retaining cylinder. Therefore, a force converted into the front and rear direction of the vehicle body while being transmitted from the outer cylinder to the retaining cylinder is applied to the damping mechanism. That is, according to the above-described configuration, it is possible to suppress a force of the axial direction from being applied to the damping mechanism and to improve the durability of the inner elastic body of the damping mechanism.

In the toe correction bushing, the retaining cylinder may include a tubular retaining cylinder body which extends along the axial direction, a bottom plate portion which extends inward in the radial direction from an end portion of the retaining cylinder body on one side of the axial direction, and a crimped portion which is located at an end portion of the retaining cylinder body on the other side of the axial direction and is crimped inward in the radial direction while the damping mechanism is inserted into the retaining cylinder body.

According to the above-described configuration, the damping mechanism is fixed to the retaining cylinder by crimping. Therefore, the process of fixing the damping mechanism to the retaining cylinder is facilitated and the manufacturing cost of the toe correction bushing can be reduced.

In the toe correction bushing, the damping mechanism may further include an inner sheath portion into which the inner cylinder is fitted and an outer sheath portion which surrounds the inner sheath portion from the outside of the radial direction and the inner sheath portion and the outer sheath portion may be connected to each other by the inner elastic body.

According to the above-described configuration, the inner elastic body in the damping mechanism is supported by the inner sheath portion and the outer sheath portion. Therefore, the damping mechanism can be reliably retained by the inner cylinder at the inner sheath portion. Further, the damping mechanism can be reliably retained by the retaining cylinder at the outer sheath portion. That is, according to the above-described configuration, it is possible to improve the retaining strength of the damping mechanism with respect to the inner cylinder and the retaining cylinder.

In the toe correction bushing, the retaining cylinder may include a facing surface which faces one side of the axial direction and faces a part of the vehicle body and the facing surface may be provided with a cushioning elastic body which cushions an impact of a collision with a part of the vehicle body.

According to the above-described configuration, when an impact is applied to the toe correction bushing, the cushioning elastic body suppresses an impact of a collision with a part of the vehicle body and the facing surface and can suppress the damping mechanism from being separated from the retaining cylinder.

Although various embodiments of the present invention have been described above, each configuration of each embodiment and a combination thereof are examples and the configuration can be added, omitted, replaced, or modified into other forms without departing from the spirit of the present invention. Further, the present invention is not limited to the embodiment.

INDUSTRIAL APPLICABILITY

By applying the toe correction bushing and the rear suspension device of the present invention to the relevant field, it is possible to provide the toe correction bushing capable of easily assembling the damping mechanism and ensuring the retaining strength of the damping mechanism.

REFERENCE SIGNS LIST

1 Toe correction bushing
2a Liquid chamber
2b Orifice passage
5 Rear suspension device
6 Trailing arm
7 Torsion beam 9 Cushioning elastic body
10 Retaining cylinder
11a Inner inclined surface
11b Facing surface
12 Bottom plate portion
13 Crimped portion
19 Retaining cylinder body
20 Outer cylinder
21a Facing surface
30 Outer elastic body
31 Toe correction portion (i.e., intervening portion)
40 Inner cylinder
50 Damping mechanism
60 Inner sheath portion
70 Outer sheath portion
80 Inner elastic body
J Center axis
L Liquid
T Tire

The invention claimed is:

1. A toe correction bushing for connecting a trailing arm and a vehicle body to each other comprising:
an inner cylinder which is fixed to the vehicle body;
a tubular damping mechanism which surrounds the inner cylinder from an outside of a radial direction;
a retaining cylinder which surrounds the damping mechanism from the outside of the radial direction;
an outer cylinder which surrounds the retaining cylinder from the outside of the radial direction and is fixed to the trailing arm; and
an outer elastic body which connects the outer cylinder and the retaining cylinder to each other,
wherein the damping mechanism includes an inner elastic body which is located between the inner cylinder and the retaining cylinder in the radial direction,
the damping mechanism is provided with a plurality of liquid chambers which are arranged side by side along a circumferential direction and filled with a liquid sealed by the inner elastic body and an orifice passage which allows the plurality of liquid chambers to communicate with each other,
the damping mechanism is inserted and fixed into the retaining cylinder,
the retaining cylinder includes an inner inclined surface which extends outward in the radial direction as the inner inclined surface is directed toward one side of an axial direction,
the outer cylinder includes an outer inclined surface which faces the inner inclined surface and extends outward in the radial direction as the outer inclined surface is directed toward the one side of the axial direction,
the outer elastic body includes an intervening portion which is disposed between the inner inclined surface and the outer inclined surface, and
the retaining cylinder includes:
a tubular retaining cylinder body which extends along the axial direction;
a bottom plate portion which extends inward in the radial direction from an end portion of the retaining cylinder body on the one side of the axial direction; and
a crimped portion which is located at an end portion of the retaining cylinder body on the other side of the axial direction and is crimped inward in the radial direction while the damping mechanism is inserted into the retaining cylinder body.

2. The toe correction bushing according to claim 1,
wherein the retaining cylinder includes a facing surface which faces the one side of the axial direction and faces a part of the vehicle body, and
the facing surface is provided with a cushioning elastic body which cushions an impact of a collision with the part of the vehicle body.

3. A toe correction bushing for connecting a trailing arm and a vehicle body to each other comprising:
an inner cylinder which is fixed to the vehicle body;
a tubular damping mechanism which surrounds the inner cylinder from an outside of a radial direction;
a retaining cylinder which surrounds the damping mechanism from the outside of the radial direction;
an outer cylinder which surrounds the retaining cylinder from the outside of the radial direction and is fixed to the trailing arm; and
an outer elastic body which connects the outer cylinder and the retaining cylinder to each other,
wherein the damping mechanism includes an inner elastic body which is located between the inner cylinder and the retaining cylinder in the radial direction,
the damping mechanism is provided with a plurality of liquid chambers which are arranged side by side along a circumferential direction and filled with a liquid sealed by the inner elastic body and an orifice passage which allows the plurality of liquid chambers to communicate with each other,
the damping mechanism is inserted and fixed into the retaining cylinder,
the retaining cylinder includes an inner inclined surface which extends outward in the radial direction as the inner inclined surface is directed toward one side of an axial direction,
the outer cylinder includes an outer inclined surface which faces the inner inclined surface and extends outward in the radial direction as the outer inclined surface is directed toward the one side of the axial direction,
the outer elastic body includes an intervening portion which is disposed between the inner inclined surface and the outer inclined surface,
the damping mechanism further includes an inner sheath portion into which the inner cylinder is fitted and an outer sheath portion which surrounds the inner sheath portion from the outside of the radial direction, and
the inner sheath portion and the outer sheath portion are connected to each other by the inner elastic body.

4. The toe correction bushing according to claim 3,
wherein the retaining cylinder includes a facing surface which faces the one side of the axial direction and faces a part of the vehicle body, and
the facing surface is provided with a cushioning elastic body which cushions an impact of a collision with the part of the vehicle body.

* * * * *